US010891490B2

(12) United States Patent
Liu et al.

(10) Patent No.: US 10,891,490 B2
(45) Date of Patent: Jan. 12, 2021

(54) PASSIVE APPROACHING OBJECT RECOGNITION FOR ENHANCING SECURITY SYSTEMS

(71) Applicant: INTERNATIONAL BUSINESS MACHINES CORPORATION, Armonk, NY (US)

(72) Inventors: Su Liu, Austin, TX (US); Fang Wang, Westford, MA (US); Sushain Pandit, Austin, TX (US); Martin Oberhofer, Sindelfingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 16/251,738

(22) Filed: Jan. 18, 2019

(65) Prior Publication Data
US 2020/0234055 A1 Jul. 23, 2020

(51) Int. Cl.
*G06K 9/00* (2006.01)
*B64C 39/02* (2006.01)

(52) U.S. Cl.
CPC ........ *G06K 9/00771* (2013.01); *B64C 39/024* (2013.01); *G06K 9/00369* (2013.01); *B64C 2201/127* (2013.01)

(58) Field of Classification Search
None
See application file for complete search history.

(56) References Cited

U.S. PATENT DOCUMENTS 9,747,502 B2 8/2017 Renkis
9,927,809 B1 3/2018 Tofte et al.
2014/0316616 A1 10/2014 Kugelmass
2015/0120094 A1 4/2015 Kimchi et al.
2016/0033966 A1 2/2016 Farris et al.
2016/0286135 A1 9/2016 Baseuny
2017/0053169 A1* 2/2017 Cuban .................... H04N 7/185
2017/0235308 A1* 8/2017 Gordon ................ G05D 1/0016
701/2
2017/0329339 A1* 11/2017 Gordon .................. G06Q 50/00
2017/0337791 A1* 11/2017 Gordon-Carroll ..........................
G08B 13/19645
2018/0046188 A1 2/2018 Hwang et al.

OTHER PUBLICATIONS

IBM, "IBM Watson to Power SoftBank Robotics' Pepper", https://www-03.ibm.com/pressius/en/pressrelease/48763.wss, IBM News Room, Jan. 6, 2016, 3 pages.
Anonymous, "Collision Avoidance for UAVs Using Simulated ADS-B Data", IPCOM000241219D, Apr. 6, 2015, 3 pages.
Byers et al., "'Dragonfly Drones' To Address the Threat of Rogue UAVs", IPCOM000244729D, Jan. 6, 2016, 5 pages.
Anonymous, "A system to deploy an Unmanned Aerial Vehicle (UAV or Drone) providing safety to vehicles moving on a track", IPCOM000250452D, Jul. 19, 2017, 5 pages.
(Continued)

*Primary Examiner* — James M Hannett
(74) *Attorney, Agent, or Firm* — William Hartwell; Andrew D. Wright; Roberts Calderon Safran & Cole, P.C.

(57) ABSTRACT

Methods and systems for passive approaching object recognition are disclosed. A method includes: detecting, by a computing device, an object in an area monitored using a camera; determining, by the computing device, whether the object is a known object or an unknown object; and in response to determining that the object is the unknown object, the computer device sending an unmanned aerial vehicle to monitor the object.

20 Claims, 4 Drawing Sheets

(56) References Cited

OTHER PUBLICATIONS

Ahmed et al., "UAV Based Monitoring System and Object Detection Technique Development for a Disaster Area", The International Archives of the Photogrammetry, Remote Sensing and Spatial Information Sciences, vol. XXXVII, 2008, 6 pages.
Lee et al., "Real-Time, Cloud-based Object Detection for Unmanned Aerial Vehicles", 2017, 8 pages.
Radovic et al., "Object Recognition in Aerial Images Using Convolutional Neural Networks", Journal of Imaging, Jun. 14, 2017, 9 pages.
Alidaee et al., "On the Flexible Demand Assignment Problems: Case of Unmanned Aerial Vehicles", IEEE Transactions on Automation Science and Engineering, vol. 8, No. 4, Oct. 2011, 4 pages.
Dormehl, "Halt! A new home security system deploys a drone to patrol your property", Digital Trends, https://www.digitaltrends.com/cool-tech/sunflower-home-awareness-system/, Nov. 5, 2016, 5 pages.
McFarland, "Forget your old alarm system. This drone will protect your house.", CNN Business, https://money.cnn.com/2016/11/03/technology/drone-home-alarm-system/index.html, Nov. 3, 2016, 4 pages.
Resh, "Hawkeye the Indoor Smart Drone Security Guard", Indiegogo, https://www.indiegogo.com/projects/hawkeye-the-indoor-smart-drone-security-guard#/, accessed Jan. 18, 2019, 14 pages.
IBM, "Visual Recognition", https://console.bluemix.net/catalog/services/visual-recognition, accessed Jan. 18, 2019, 3 pages.
Anonymous, "3D Crime-Accident Scene Drone System", Officer. com, "https://www.officer.com/on-the-street/vehicles-equipment/product/12167667/uav-direct-3d-crimeaccident-scene-drone-system", Feb. 23, 2016, 2 pages.

* cited by examiner

PASSIVE APPROACHING OBJECT RECOGNITION FOR ENHANCING SECURITY SYSTEMS

BACKGROUND

The present invention generally relates to computing devices and, more particularly, to methods and systems for passive approaching object recognition.

Security systems including one or more cameras are typically used to monitor particular areas under observation and detect objects entering the areas being monitored. Security systems may also include one or more unmanned aerial vehicles (i.e., "drones") that are used to patrol and monitor the areas under observation, tracking events and objects.

SUMMARY

In a first aspect of the invention, there is a method that includes: detecting, by a computing device, an object in an area monitored using a camera; determining, by the computing device, whether the object is a known object or an unknown object; and in response to determining that the object is the unknown object, the computer device sending an unmanned aerial vehicle to monitor the object.

In another aspect of the invention, there is a computer program product that includes a computer readable storage medium having program instructions embodied therewith. The program instructions are executable by a computing device to cause the computing device to: detect an object in an area monitored using a camera; determine whether the object is a known object or an unknown object; in response to determining that the object is the known object: determine whether the object is included in a permitted object list or a prohibited object list; and in response to determining that the object is included in the prohibited object list, send an alert to an administrator; and in response to determining that the object is the unknown object, send an unmanned aerial vehicle to monitor the object.

In another aspect of the invention, there is a system that includes: a hardware processor, a computer readable memory, and a computer readable storage medium associated with a computing device; program instructions configured to detect an object in an area monitored using a camera; program instructions configured to determine whether the object is a known object or an unknown object; and program instructions configured to, in response to determining that the object is the unknown object, send an unmanned aerial vehicle to monitor the object, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for passive approaching object recognition. As described herein, aspects of the invention include a method and system that monitor an area using one or more cameras, detect an object in the monitored area, determine whether or not the detected object is a known object, and, in response to the detected object not being a known object, dispatch an unmanned aerial vehicle to monitor the object.

Conventional security systems that utilize unmanned aerial vehicles have problems of efficiency, reliability, and capability due to the limited battery life and range of the unmanned aerial vehicles. In particular, in conventional security systems, the patrol time, routine, and range of unmanned aerial vehicles are predefined and limited. Additionally, in conventional security systems, unmanned aerial vehicles may monitor family members, friends, neighbors, and other known individuals, potentially making these individuals uncomfortable. Additionally, conventional security systems do not provide for passive object recognition and therefore are unable to learn to recognize new, harmless objects in real-time and adjust the monitoring accordingly.

Aspects of the invention address the above-mentioned problems of efficiency, reliability, and capability associated with conventional security systems and improve the functioning of a computer by providing a system and method for passive approaching object recognition in which unmanned aerial vehicles are used to collect information to aid in the recognition of unknown objects. In particular, embodiments improve software by providing an improved system and method that monitor an area using one or more cameras, detect an object in the monitored area, determine whether or not the detected object is a known object, and, in response to the detected object not being a known object, dispatch an unmanned aerial vehicle to monitor the object. Additionally, embodiments improve software by providing an improved system and method that receive information about an unknown object from an administrator and create a record in an object database that is used by the system to recognize the object as a known object during subsequent encounters. Additionally, implementations of the invention use techniques that are, by definition, rooted in computer technology (e.g., deep learning techniques including computer vision). For example, computer vision includes using computers to acquire, process, analyze, and understand digital images.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
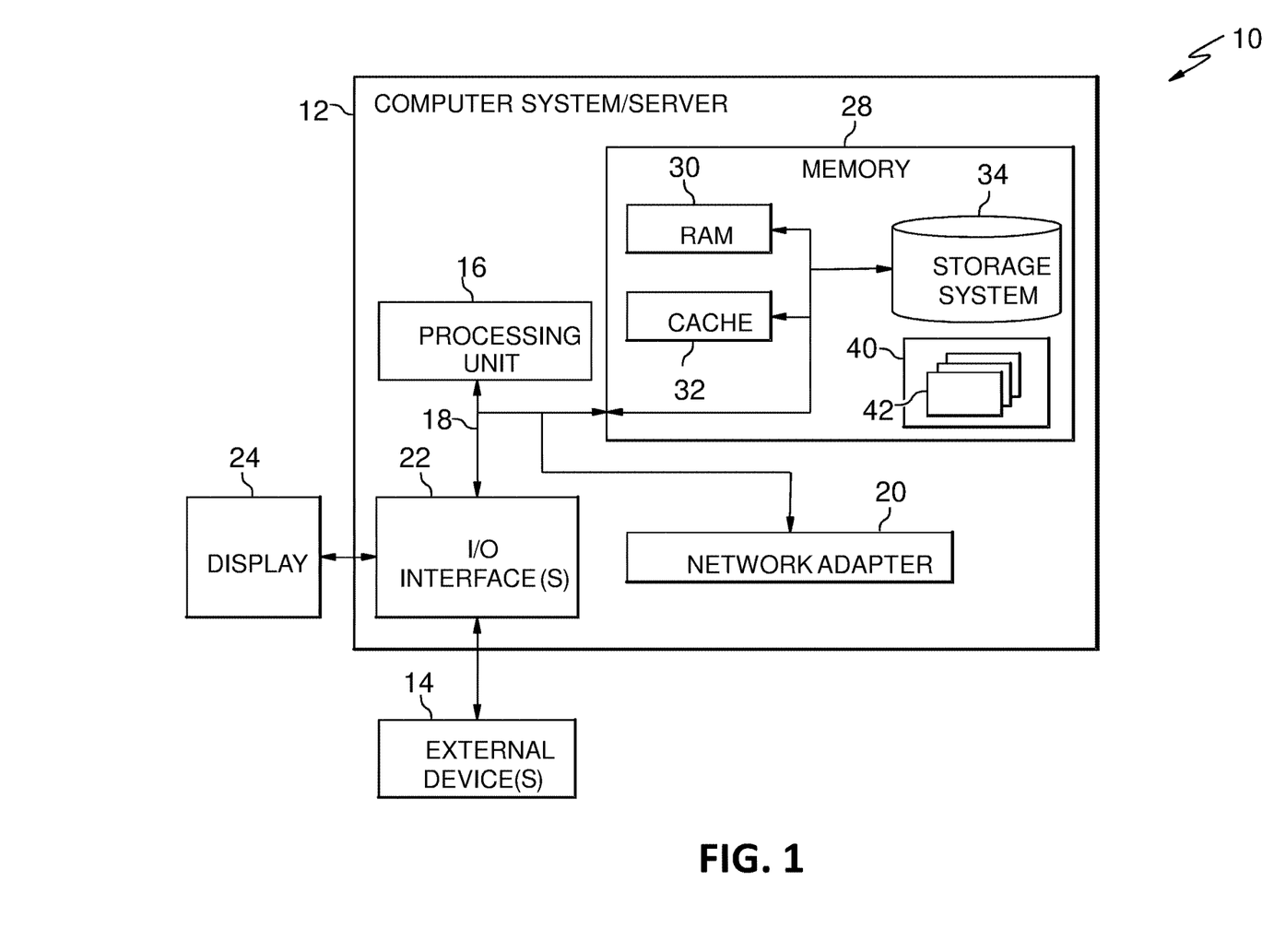
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
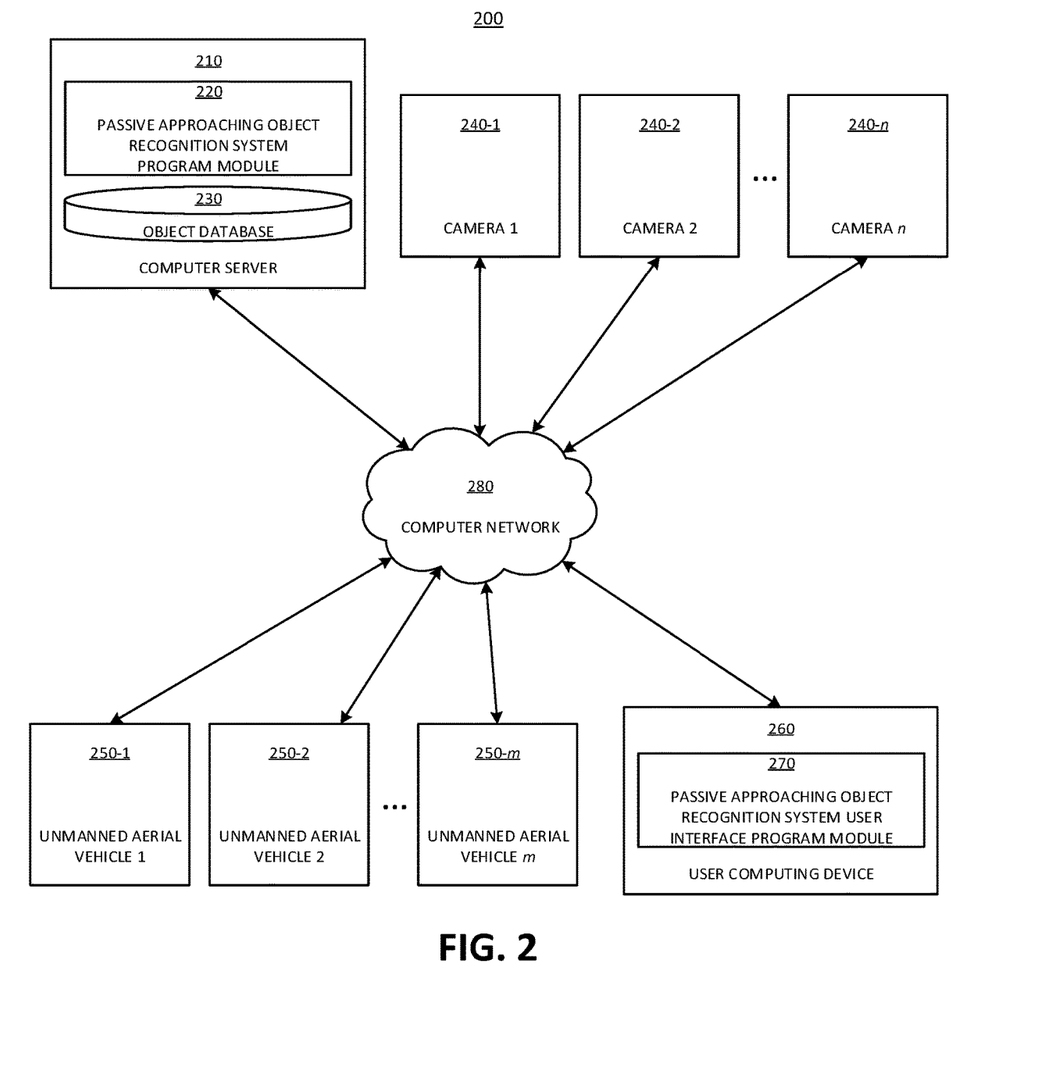
FIG. 2 depicts an illustrative environment in accordance with aspects of the invention.

FIG. 2 depicts an illustrative environment 200 in accordance with aspects of the invention. As shown, the environment 200 comprises a computer server 210, a plurality of cameras 240-1, 240-2, . . . , 240-$n$, a plurality of unmanned aerial vehicles 250-1, 250-2, . . . , 250-$m$, and a user computing device 260 which are in communication via a computer network 280. In embodiments, the computer network 280 is any suitable network including any combination of a LAN, WAN, or the Internet. In embodiments, the computer server 210, the plurality of cameras 240-1, 240-2, . . . , 240-$n$, the plurality of unmanned aerial vehicles 250-1, 250-2, . . . , 250-$m$, and the user computing device 260 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a passive approaching object recognition system program module 220, which includes hardware and/or software and is one or more of the program modules 42 shown in FIG. 1. According to an embodiment, the passive approaching object recognition system program module 220 includes program instructions for performing passive approaching object recognition for a security system. In embodiments, the program instructions included in the passive approaching object recognition system program module 220 of the computer server 210 are executed by one or more hardware processors.

In embodiments, the computer server 210 also includes an object database 230. In other embodiments, the object database 230 may be located externally to the computer server 210 in a location that is accessible to the computer server 210. The object database 230 is a centralized database that stores information about known objects, including object fingerprints (discussed below).

Still referring to FIG. 2, in embodiments, each of the plurality of cameras 240-1, 240-2, . . . , 240-*n* is a digital video camera or a digital still camera that is positioned such that the camera captures video or still images of all or a portion of an area being monitored by a security system. Each of the plurality of unmanned aerial vehicles 250-1, 250-2, . . . , 250-*m* is a drone or other compact aircraft without a human pilot aboard. Each of the plurality of unmanned aerial vehicles 250-1, 250-2, . . . , 250-*m* has one or more electric motors powered by one or more batteries. In alternative embodiments, each of the plurality of unmanned aerial vehicles 250-1, 250-2, . . . , 250-*m* has one or more motors powered by gasoline or other fuels.

Still referring to FIG. 2, in embodiments, the user computing device 260 is a computer device comprising one or more elements of the computer system/server 12 (as shown in FIG. 1) and is a desktop computer, a laptop computer, a mobile device such as a cellular phone, tablet, personal digital assistant (PDA), or other computing device. In other embodiments, the user computing device 260 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the user computing device 260 is usable by an administrator of a security system. In particular, the user computing device 260 includes a passive approaching object recognition system user interface program module 270, which includes hardware and/or software and is one or more of the program modules 42 shown in FIG. 1. According to an embodiment, the passive approaching object recognition system user interface program module 270 includes program instructions for displaying a passive approaching object recognition system graphical user interface on the user computing device 260, including information about objects detected by the security system. The passive approaching object recognition system user interface program module 270 is usable by an administrator of the security system to review information about the objects detected by the security system, provide information about unknown objects detected by the security system, and adjust settings and parameters used by the security system.

Figure 3:
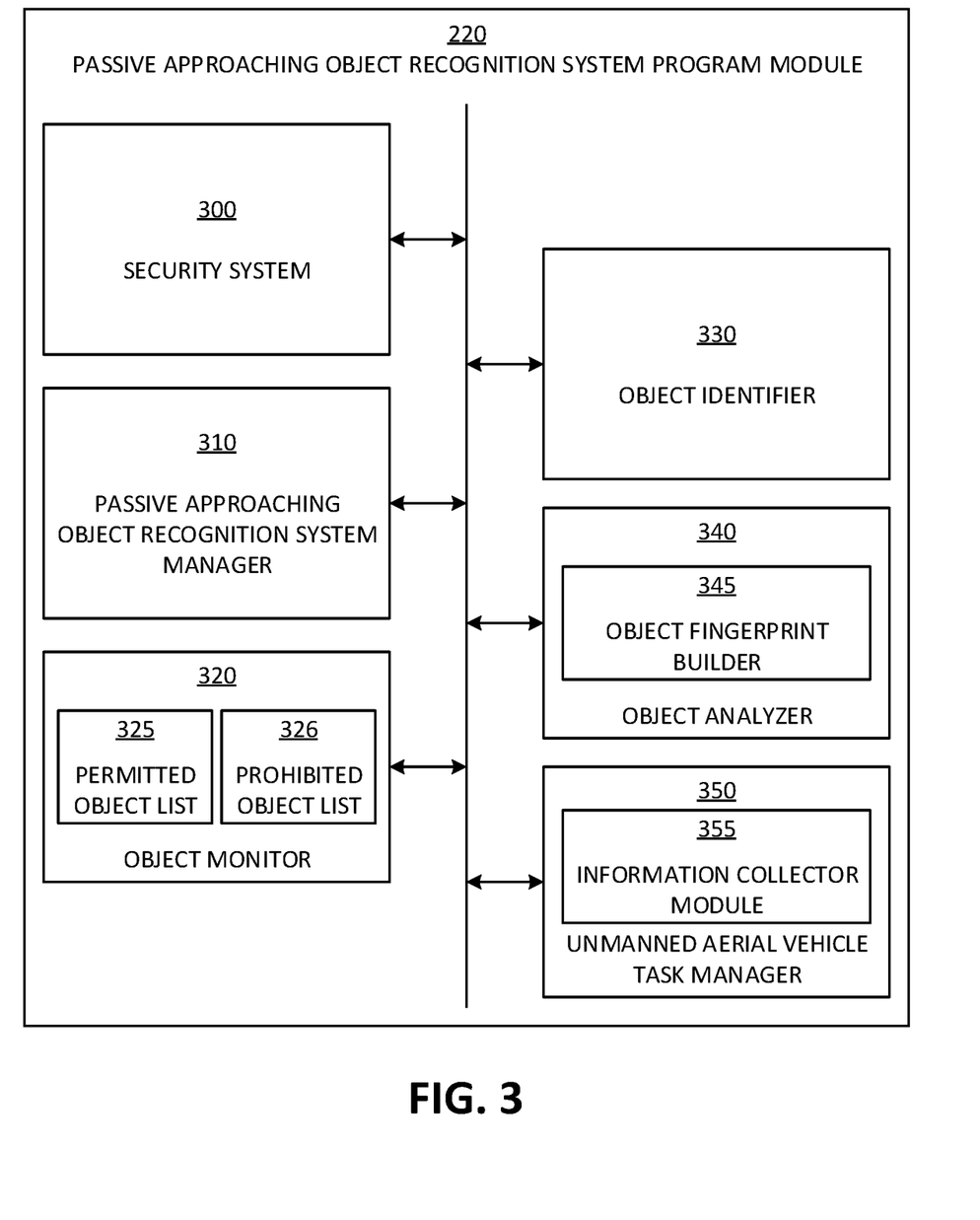
FIG. 3 shows a block diagram of an exemplary program module in accordance with aspects of the invention.

FIG. 3 shows a block diagram of the passive approaching object recognition system program module 220 in the computer server 210 in accordance with aspects of the invention. According to aspects of the invention, the passive approaching object recognition system program module 220 includes a security system 300, a passive approaching object recognition system manager 310, an object monitor 320, an object identifier 330, an object analyzer 340, and an unmanned aerial vehicle task manager 350.

In embodiments, the security system 300 of the passive approaching object recognition system program module 220 in the computer server 210 is a module configured to interface with and control elements of the security system, including cameras 240-1, 240-2, . . . , 240-*n* (of FIG. 2). In particular, the security system 300 receives and monitors the video and/or still images provided by the cameras 240-1, 240-2, . . . , 240-*n* to detect motion and/or any other changes in the video and/or still images. Upon the detection of motion and/or any other changes in the video and/or still images, the security system 300 communicates with the object monitor 320 (described below) to initiate a process for identifying objects in the video and/or still images.

Still referring to FIG. 3, in embodiments, the passive approaching object recognition system manager 310 of the passive approaching object recognition system program module 220 in the computer server 210 is a module configured to control the passive approaching object recognition system. In particular, the passive approaching object recognition system manager 310 stores a service profile which comprises a set of criteria used to determine when and how one of the plurality of unmanned aerial vehicles 250-1, 250-2, . . . , 250-*m* is to be activated. The criteria in the service profile include distance-related criteria (e.g., only activate one of the plurality of unmanned aerial vehicles 250-1, 250-2, . . . , 250-*m* for object identification when the object is within a predetermined distance), routine-related criteria (e.g., alternate between the unmanned aerial vehicles 250-1, 250-2, . . . , 250-*m*, always use unmanned aerial vehicles 250-1 unless the distance to the object is more than a predetermined distance, or use the unmanned aerial vehicles 250-1, 250-2, . . . , 250-*m* having the greatest remaining battery charge), and object-related criteria (ignore vehicles passing by the area under observation at more than a predetermined speed). Other criteria may also be included in the service profile that relate to the selecting, activating, and monitoring of one or more of the plurality of unmanned aerial vehicles 250-1, 250-2, . . . , 250-*m*.

In embodiments, the object monitor 320 of the passive approaching object recognition system program module 220 in the computer server 210 is a module configured to manage a process of identifying objects in the video and/or still images received from the cameras 240-1, 240-2, . . . , 240-*n*. In particular, in response to the security system 300 detecting motion and/or any other changes in the video and/or still images provided by the cameras 240-1, 240-2, . . . , 240-*n*, the object monitor 320 is tasked by the security system 300 with initiating a process for identifying objects in the video and/or still images using the object identifier 330 (discussed below).

Additionally, the object monitor 320 maintains object watching lists including a permitted object list 325 and a prohibited object list 326. The permitted object list 325 includes one or more permitted objects that are to be ignored by the security system. The prohibited object list 326 includes one or more prohibited objects, the detection of which triggers an alert by the security system or any other action (e.g., play a sound, broadcast a warning message, turn on lights, etc.) defined by an administrator of the security system. In an example, the permitted object list 325 may include family members, friends, and pets, and the prohibited object list 326 may include potentially dangerous wildlife such as a bear, coyote, etc.

Still referring to FIG. 3, in embodiments, the object identifier 330 of the passive approaching object recognition system program module 220 in the computer server 210 is a module configured to identify observed objects in the area under observation using deep learning techniques. In particular, in response to a request from the object monitor 320, the object identifier 330 uses deep learning techniques including computer vision as well as the object database 230 to analyze the video and/or still images provided by the cameras 240-1, 240-2, . . . , 240-*n* to identify objects therein. The object identifier 330 uses the object analyzer 340 (described below) to analyze objects that cannot be identified using the object database 230.

In embodiments, the object identifier 330 also includes an object classifier module. After unidentified objects are analyzed by the object analyzer 340 (as described below) and subsequently identified, the object classifier module classifies the newly identified objects into the permitted object list 325 or the prohibited object list 326 and stores information about the newly identified objects into the object database 230 on the computer server 210 (of FIG. 2).

Still referring to FIG. 3, in embodiments, the object analyzer 340 of the passive approaching object recognition system program module 220 in the computer server 210 is a module configured to analyze observed behaviors of objects (e.g., movement direction, speed, and position) that cannot be identified by the object identifier 330. The object analyzer 340 selects objects that cannot be identified by the object identifier 330 as unrecognized target objects to be tracked by one or more of the plurality of unmanned aerial vehicles 250-1, 250-2, ..., 250-m.

In embodiments, the object analyzer 340 includes an object synchronizer module configured to store information collected about the target objects by the one or more of the plurality of unmanned aerial vehicles 250-1, 250-2, ..., 250-m in the object database 230. The object analyzer 340 also includes an object fingerprint builder 345 configured to process the information about each of the target objects collected by the one or more of the plurality of unmanned aerial vehicles 250-1, 250-2, ..., 250-m and build, for each of the target objects, an object fingerprint including an object ID, object images, gestures, walking speed, moving direction, mobile device MAC addresses, and/or any other information usable for recognizing the target object. The object analyzer 340 also includes an object learning module configured to send a report to an administrator of the security system, via the passive approaching object recognition system user interface program module 270 on the user computing device 260, about the target objects analyzed by the object analyzer 340. Additionally, the administrator may be prompted to indicate, via the passive approaching object recognition system user interface program module 270 on the user computing device 260, whether the target objects are to be added to the permitted object list 325 or the prohibited object list 326. By building an object fingerprint and adding each of the target objects to the permitted object list 325 or the prohibited object list 326, the object identifier 330 is subsequently able to identify the target objects, obviating the need for the object analyzer 340 to again select that object to be tracked by one or more of the plurality of unmanned aerial vehicles 250-1, 250-2, ..., 250-m.

Still referring to FIG. 3, in embodiments, the unmanned aerial vehicle task manager 350 of the passive approaching object recognition system program module 220 in the computer server 210 is a module configured to select one or more of the plurality of unmanned aerial vehicles 250-1, 250-2, ..., 250-m to monitor objects selected as unrecognized target objects by the object analyzer 340 and assign a monitoring task to the selected one or more unmanned aerial vehicles 250-1, 250-2, ..., 250-m. In particular, for each assigned monitoring task, the unmanned aerial vehicle task manager 350 generates and stores a task data structure that includes unmanned aerial vehicle ID that uniquely identifies the particular unnamed aerial vehicle selected from the plurality of unmanned aerial vehicles 250-1, 250-2, ..., 250-m for monitoring the object, an object ID that uniquely identifies the particular object to be monitored, and a task ID that uniquely identifies the particular task.

In embodiments, the unmanned aerial vehicle task manager 350 includes an unmanned aerial vehicle controller configured to launch the one or more of the plurality of unmanned aerial vehicles 250-1, 250-2, ..., 250-m selected by the unmanned aerial vehicle task manager 350 to monitor an unidentified target object, in accordance with the set of criteria stored in the service profile by the passive approaching object recognition system program module 220.

In embodiments, the unmanned aerial vehicle task manager 350 is further configured to receive observations from the one or more of the plurality of unmanned aerial vehicles 250-1, 250-2, ..., 250-m monitoring the object. In particular, the one or more of the plurality of unmanned aerial vehicles 250-1, 250-2, ..., 250-m monitoring the object sends observations including images, movement direction, movement speed, and/or walking patterns to the unmanned aerial vehicle task manager 350. Additionally, the one or more of the plurality of unmanned aerial vehicles 250-1, 250-2, ..., 250-m may collect and send information about electronic signals of devices being carried by a person (e.g., a WiFi MAC address or Bluetooth MAC address) to an information collector module 355 in the unmanned aerial vehicle task manager 350. The information collector module 355 of the unmanned aerial vehicle task manager 350 then provides the received observations about the object to the object identifier 330 and requests that the object identifier 330 identify the object.

In embodiments, if the object identifier 330 is able to identify the object using the received observations and the object database 230, then the passive approaching object recognition system program module 220 causes the object monitor 320 to determine whether the object is present in the permitted object list 325 or the prohibited object list 326, as described above. If the object monitor 320 determines that the object is present in the permitted object list 325, then the passive approaching object recognition system program module 220 determines that the object is to be ignored by the security system, and the unmanned aerial vehicle task manager 350 instructs the one or more of the plurality of unmanned aerial vehicles 250-1, 250-2, ..., 250-m that is monitoring the object to discontinue the monitoring. On the other hand, if the object monitor 320 determines that the object is present in the prohibited object list 326, then the passive approaching object recognition system program module 220 causes an alert to be sent to an administrator of the security system via the passive approaching object recognition system user interface program module 270 on the user computing device 260. Additionally, in embodiments, if the object is present in the prohibited object list 326, then the unmanned aerial vehicle task manager 350 is configured to continue monitoring the object using the launched one or more of the plurality of unmanned aerial vehicles 250-1, 250-2, ..., 250-m.

In embodiments, if the object cannot be identified by the object identifier 330, then the passive approaching object recognition system program module 220 causes an alert to be sent to an administrator of the security system, via the passive approaching object recognition system user interface program module 270 on the user computing device 260, indicating that an unidentified object is present in the area under observation. The administrator of the security system is then prompted to identify the object and indicate whether the object is to be added to the permitted object list 325 or the prohibited object list 326. In particular, the object synchronizer module of the object analyzer 340 is configured to store, in the object database 230, information collected about the target objects by the one or more of the plurality of unmanned aerial vehicles 250-1, 250-2, ..., 250-m. The object fingerprint builder 345 of the object analyzer 340 is configured to process the information about each of the target objects collected by the one or more of the plurality of unmanned aerial vehicles 250-1, 250-2, . . . , 250-m and build, for each of the target objects, an object fingerprint including an object ID, object images, gestures, walking speed, moving direction, mobile device MAC addresses, and/or any other information usable for recognizing the target object. The object analyzer 340 then stores the object fingerprint in the object database 230.

Figure 4:
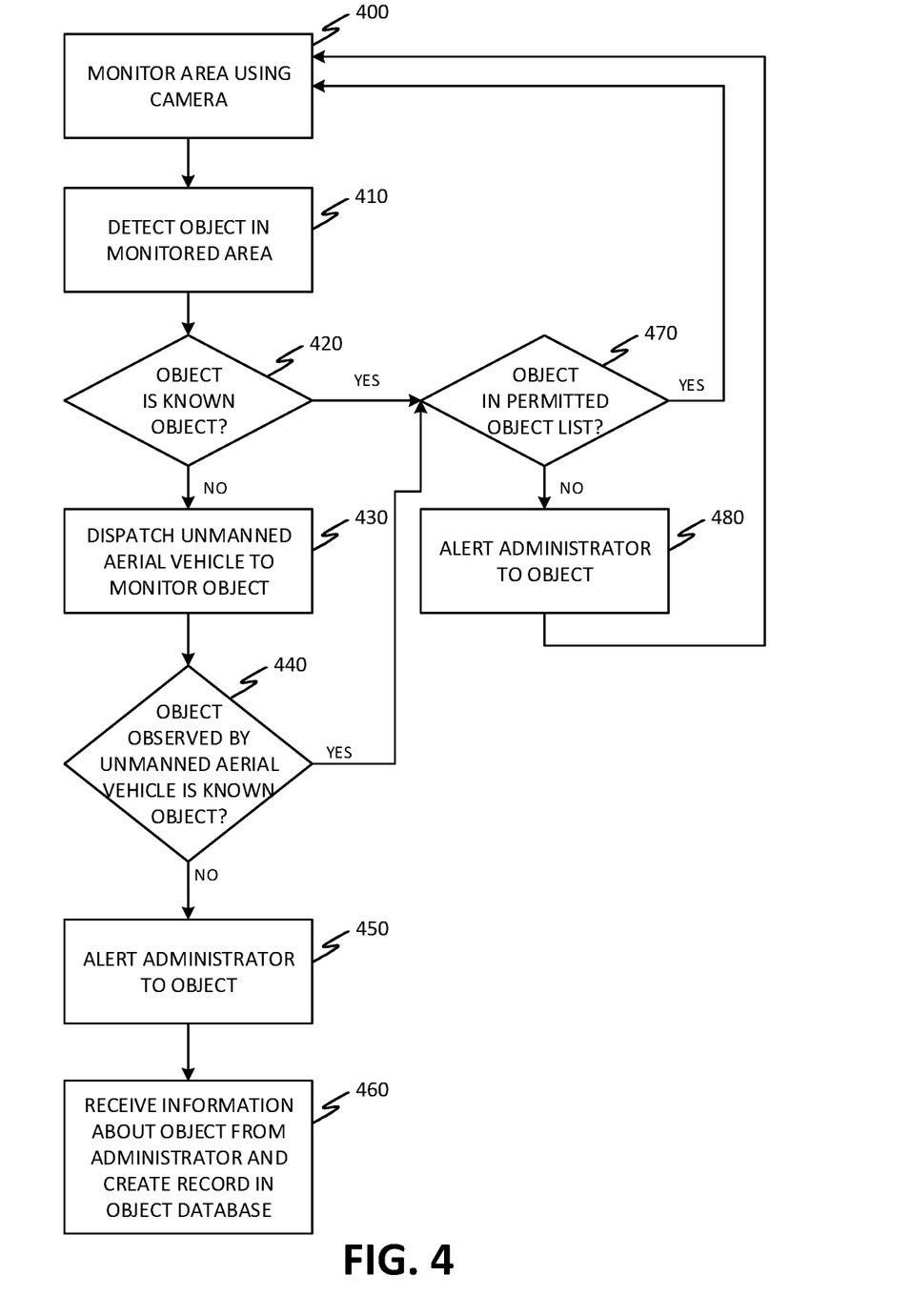
FIG. 4 depicts a flowchart of an exemplary method performed in accordance with aspects of the invention.

FIG. 4 depicts a flowchart of an exemplary method performed by the passive approaching object recognition system program module 220 of the computer server 210 in accordance with aspects of the invention. The steps of the method are performed in the environment of FIG. 2 and are described with reference to the elements shown in FIGS. 2 and 3.

At step 400, the computer server 210 monitors an area using a camera. In embodiments, as described with respect to FIG. 3, step 400 may be performed by the security system 300 of the passive approaching object recognition system program module 220 running on the computer server 210. In particular, the security system 300 receives and monitors the video and/or still images of an area under observation provided by the cameras 240-1, 240-2, . . . , 240-n to detect motion and/or any other changes in the video and/or still images.

At step 410, the computer server 210 detects an object in the monitored area. In embodiments, as described with respect to FIG. 3, step 410 may be performed by the security system 300 and the object monitor 320 of the passive approaching object recognition system program module 220 running on the computer server 210. In particular, upon the detection of motion and/or any other changes in the video and/or still images, the security system 300 communicates with the object monitor 320 to initiate a process for identifying objects in the video and/or still images using the object identifier 330.

At step 420, the computer server 210 determines whether or not the object is a known object. In embodiments, as described with respect to FIG. 3, step 420 may be performed by the object identifier 330 of the passive approaching object recognition system program module 220 running on the computer server 210. The object identifier 330 uses deep learning techniques including computer vision as well as the object database 230 to identify observed objects in the area under observation. In particular, the object identifier 330 determines whether or not the object detected at step 410 is a known object by comparing the object to the object fingerprints stored in the object database 230. If the object identifier 330 determines that the object detected at step 410 is not a known object, then the flow proceeds to step 430. On the other hand, if the object identifier 330 determines that the object detected at step 410 is a known object, then the flow proceeds to step 470.

At step 430, the computer server 210 dispatches an unmanned aerial vehicle to monitor the object. In embodiments, as described with respect to FIG. 3, step 430 may be performed by the unmanned aerial vehicle task manager 350 of the passive approaching object recognition system program module 220 running on the computer server 210. In particular, the unmanned aerial vehicle task manager 350 causes one or more unmanned aerial vehicles 250-1, 250-2, . . . , 250-m to be launched to monitor the object detected at step 410 (i.e., the unidentified target object), in accordance with the set of criteria stored in the service profile by the passive approaching object recognition system program module 220. The one or more of the plurality of unmanned aerial vehicles 250-1, 250-2, . . . , 250-m monitoring the object sends observations including images, movement direction, movement speed, and/or walking patterns to the unmanned aerial vehicle task manager 350. Additionally, the one or more of the plurality of unmanned aerial vehicles 250-1, 250-2, . . . , 250-m may send information about electronic signals of mobile devices being carried by a person (e.g., a WiFi MAC address or Bluetooth MAC address) to an information collector module 355 in the unmanned aerial vehicle task manager 350. The information collector module 355 of the unmanned aerial vehicle task manager 350 then provides the received observations about the object to the object identifier 330.

At step 440, the computer server 210 determines whether or not the object observed by the unmanned aerial vehicle is a known object. In embodiments, as described with respect to FIG. 3, step 440 may be performed by the object identifier 330 of the passive approaching object recognition system program module 220 running on the computer server 210. The object identifier 330 uses deep learning techniques including computer vision as well as the object database 230 to identify observed objects in the area under observation. In particular, the object identifier 330 uses the information collected by the one or more of the plurality of unmanned aerial vehicles 250-1, 250-2, . . . , 250-m monitoring the object (provided by the information collector module 355 of the unmanned aerial vehicle task manager 350 to the object identifier 330) to determine whether or not the object is a known object by comparing the newly collected information about the object to the object fingerprints stored in the object database 230. If the object identifier 330 determines that the object is not a known object, then the flow proceeds to step 450. On the other hand, if the object identifier 330 determines that the object is a known object, then the flow proceeds to step 470.

At step 450, the computer server 210 alerts the administrator to the object. In embodiments, as described with respect to FIG. 3, step 450 may be performed by the passive approaching object recognition system program module 220 running on the computer server 210. In particular, if the object still cannot be identified by the object identifier 330 using the information collected by the one or more of the plurality of unmanned aerial vehicles 250-1, 250-2, . . . , 250-m tracking the object, the passive approaching object recognition system program module 220 causes an alert to be sent to an administrator of the security system, via the passive approaching object recognition system user interface program module 270 on the user computing device 260, indicating that an unknown object is present in the area under observation. In embodiments, the passive approaching object recognition system program module 220 prompts the administrator to provide information, via the passive approaching object recognition system user interface program module 270 on the user computing device 260, about an identity of the unknown object as well prompting the administrator to add the object to the permitted object list 325 or the prohibited object list 326.

At step 460, the computer server 210 receives information about the object from the administrator and creates a record in the object database 230. In embodiments, as described with respect to FIG. 3, step 460 may be performed by the object identifier 330 and the object analyzer 340 of the passive approaching object recognition system program module 220 running on the computer server 210. In particular, the object synchronizer module of the object analyzer 340 is configured to store information collected about the object by the one or more of the plurality of unmanned aerial vehicles 250-1, 250-2, . . . , 250-*m* as well as the information received from the administrator about the identity of the object in the object database 230 in the form of an object fingerprint generated by the object fingerprint builder 345 of the object analyzer 340. Additionally, based on the information received from the administrator, the object analyzer 340 adds the object to the permitted object list 325 or the prohibited object list 326.

At step 470, the computer server 210 determines whether or not the object is in the permitted object list 325. In embodiments, as described with respect to FIG. 3, step 470 may be performed by the object monitor 320 of the passive approaching object recognition system program module 220 running on the computer server 210. If the object monitor 320 determines that the object is in the permitted object list 325, then the flow returns to step 400. On the other hand, if the object monitor 320 determines that the object is not in the permitted object list 325 (or, in embodiments, determines that the object is in the prohibited object list 326), then the flow proceeds to step 480.

At step 480, the computer server 210 alerts the administrator to the object. In embodiments, as described with respect to FIG. 3, step 470 may be performed by the passive approaching object recognition system program module 220, which causes an alert to be sent to an administrator of the security system via the passive approaching object recognition system user interface program module 270 on the user computing device 260. In alternative embodiments, the passive approaching object recognition system program module 220 also causes the unmanned aerial vehicle task manager 350 to cause one or more of the plurality of unmanned aerial vehicles 250-1, 250-2, . . . , 250-*m* to approach the object and provide an audio or visual warning (e.g., a voice announcement). The passive approaching object recognition system program module 220 may also cause the unmanned aerial vehicle task manager 350 to cause one or more of the plurality of unmanned aerial vehicles 250-1, 250-2, . . . , 250-*m* to continue monitoring and observing the object as long as the object remains in the area under observation.

In embodiments, the computer server 210 may be a centralized server accessible to a plurality of users each operating his or her own security system. Accordingly, the object database 230 as well as the permitted object list 325 and the prohibited object list 326 maintained by the object monitor 320 may be used by each of the plurality of users, and additions to the object database 230, the permitted object list 325, and the prohibited object list 326 (e.g., based upon information received from an administrator at step 460) may be shared among all of the users.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting, by a computing device, an object in an area monitored using a camera;
   determining, by the computing device and based on information from the camera, that the object is an unknown object;
   sending, by the computing device and in response to determining that the object is the unknown object, an unmanned aerial vehicle to monitor the object;
   receiving, by the computing device, observations from the unmanned aerial vehicle, the observations being of the object;
   identifying, by the computing device and using the observations, the object;
   determining, by the computing device, that the object is on a permitted object list; and
   instructing, by the computing device and based on the object being on the permitted object list, the unmanned aerial vehicle to discontinue monitoring the object,
   wherein the camera is located at a location other than on the unmanned aerial vehicle.

2. The method according to claim 1, wherein the determining that the object is the unknown object comprises comparing images of the object obtained from the camera to object fingerprints stored in an object database.

3. The method according to claim 2, wherein the determining that the object is the unknown object further comprises comparing behaviors of the object to the object fingerprints stored in the object database.

4. The method according to claim 1, wherein the observations received from the unmanned aerial vehicle comprise additional images and information about behaviors of the object.

5. The method according to claim 4, wherein the identifying the object comprises the computer device comparing the additional images and the information about behaviors of the object received from the unmanned aerial vehicle to object fingerprints stored in an object database.

6. The method according to claim 4, further comprising:
   generating, by the computing device, an object fingerprint for the object using the observations; and
   storing, by the computing device, the object fingerprint for the object in the object database.

7. A computer program product comprising a computer readable storage medium having program instructions embodied therewith, the program instructions executable by a computing device to cause the computing device to:
- detect an object in an area monitored using a camera;
- determine, based on information from the camera, that the object is an unknown object;
- in response to determining that the object is the unknown object, send an unmanned aerial vehicle to monitor the object;
- receive observations from the unmanned aerial vehicle, the observations being of the object;
- identify the object using the observations; and
- instruct, based on the object being identified, the unmanned aerial vehicle to discontinue monitoring the object,
- wherein the camera is located at a location other than on the unmanned aerial vehicle.

8. The computer program product according to claim 7, wherein the determining that the object is the unknown object comprises comparing images of the object obtained from the camera to object fingerprints stored in an object database.

9. The computer program product according to claim 8, wherein the determining that the object is the unknown object further comprises comparing behaviors of the object to the object fingerprints stored in the object database.

10. The computer program product according to claim 7, wherein the observations received from the unmanned aerial vehicle comprise additional images and information about behaviors of the object.

11. The computer program product according to claim 10, wherein the identifying the object comprises comparing the additional images and the information about behaviors of the object received from the unmanned aerial vehicle to object fingerprints stored in an object database.

12. The computer program product according to claim 11, the program instructions further being executable by the computing device to cause the computing device to:
- generate an object fingerprint for the object using the observations; and
- store the object fingerprint for the object in the object database.

13. A system comprising:
- a hardware processor, a computer readable memory, and a computer readable storage medium associated with a computing device;
- program instructions configured to detect an object in an area monitored using a camera;
- program instructions configured to determine, based on information from the camera, that the object is an unknown object;
- program instructions configured to, in response to determining that the object is the unknown object, send an unmanned aerial vehicle to monitor the object;
- program instructions configured to receive observations from the unmanned aerial vehicle, the observations being of the object;
- program instructions configured to identify the object using the observations;
- program instructions configured to determine that the object is on a permitted object list; and
- program instructions configured to instruct, based on the object being on the permitted object list, the unmanned aerial vehicle to discontinue monitoring the object,
- wherein the camera is located at a location other than on the unmanned aerial vehicle, and
- wherein the program instructions are stored on the computer readable storage medium for execution by the hardware processor via the computer readable memory.

14. The system according to claim 13, wherein the program instructions configured to determine that the object is the unknown object comprise program instructions configured to compare images of the object obtained from the camera to object fingerprints received from a plurality of users and stored in an object database on a centralized server accessible to each of the plurality of users.

15. The system according to claim 14, wherein the program instructions configured to determine that the object is the unknown object further comprise program instructions configured to compare behaviors of the object to the object fingerprints stored in the object database.

16. The system according to claim 13, wherein the observations received from the unmanned aerial vehicle comprise additional images and information about behaviors of the object.

17. The system according to claim 16, wherein the identifying the object comprises comparing the additional images and the information about behaviors of the object received from the unmanned aerial vehicle to object fingerprints stored in an object database.

18. The method according to claim 1, wherein
the object is a person, and
the observations comprise information about electronic signals of devices being carried by the person.

19. The method according to claim 18, wherein the observations further comprise images or the person, a movement direction of the person, a movement speed of the person, and a walking pattern of the person.

20. The computer program product according to claim 7, the program instructions further being executable by the computing device to cause the computing device to:
- add the object to a permitted object list;
- store information about the object in an object database;
- subsequently detect the object in the area monitored using the camera, the subsequent detecting being after the detecting;
- compare information gathered by the camera during the subsequent detecting to the information about the object stored in the object database;
- determine, based on the comparing, that the object is on the permitted object list; and
- prevent deployment of a second unmanned aerial vehicle to monitor the object after the subsequent detecting, the preventing being based on the object being on the permitted object list.

* * * * *